United States Patent [19]

Van Wingerden

[11] Patent Number: 4,777,764
[45] Date of Patent: Oct. 18, 1988

[54] PLANT GROWING CONTAINER AND METHOD

[76] Inventor: Aart Van Wingerden, Rte. 1, Box 74A, Horse Shoe, N.C. 28742

[21] Appl. No.: 888,087

[22] Filed: Jul. 17, 1986

Related U.S. Application Data

[63] Continuation of Ser. No. 805,399, Dec. 4, 1985, which is a continuation-in-part of Ser. No. 619,008, Jun. 11, 1984, which is a continuation of Ser. No. 520,758, Aug. 8, 1983, Pat. No. 4,453,344, which is a continuation of Ser. No. 279,626, Jul. 1, 1981, abandoned.

[51] Int. Cl.⁴ .............................................. A01G 9/02
[52] U.S. Cl. .................................................... 47/85
[58] Field of Search .................. 47/63, 73, 77, 84-87; 111/2-3

[56] References Cited

U.S. PATENT DOCUMENTS

| | | | |
|---|---|---|---|
| 4,006,558 | 2/1977 | Neddo et al. | 47/77 |
| 4,057,932 | 11/1977 | Spencer | 47/77 |
| 4,453,344 | 6/1984 | Van Wingerden | 47/85 |

Primary Examiner—Robert E. Bagwill
Attorney, Agent, or Firm—David M. Carter

[57] ABSTRACT

A seedling container is illustrated wherein a number of removable partitions or barriers are clamped together in a block by releasable clamping means permitting alignment of the partitions and then sequential removal in such a way as to support the removed partitions while removing the seedlings one row at a time. Additional stability and alignment is provided through the use of projections and slots as well as additional clamping means. Air pruning is provided, and through the use of a converging bottom in alternate compartments occupied by seedling plugs, loss of growing medium is avoided.

4 Claims, 4 Drawing Sheets

PLANT GROWING CONTAINER AND METHOD

This application is a continuation, of application Ser. No. 805,399, filed Dec. 4, 1985, which is a continuation of application Ser. No. 619,008, filed 6-11-84, and a continuation of application Ser. No. 520,758, filed 8-8-83, now U.S. Pat No. 4,453,344, which is a continuation of application Ser. No. 279,626 filed July 2, 1981 now abn.

BACKGROUND OF THE INVENTION

The most widely used type of seedling tray now on the market is exemplified by the disclosure of U.S. Pat. No. 3,667,159. The tray of this patent possesses disadvantages in that removal of the plugs and seedlings from the tray results in varying degrees of plant shock whether or not the seedling is simply pulled out from the top or poked out from the bottom, or whether the tray is partially turned over to facilitate jarring the seedlings loose. All such shocks to the plant are detrimental to further growth, and it is an important object of the present invention to provide a seedling tray and the like wherein removable partitions may be pulled away one at a time with greater facility to permit the plants to easily be removed or fall out from the confinement between a pair of diverging walls of the partitions.

Further objectives of the invention include the provision of fastening means including aligning and fastening or clamping means for assembling the partitions as well as the provision of means to prevent growing medium from falling out of the compartments.

This is an improvement upon the seedling tray illustrated in U.S. Pat. No. 4,050,188. U.S. Pat. No. 1,307,886, France, dated Sept. 17, 1962, illustrates the use of partitions, but the rows thereof are joined at the bottom and the bottom portions are hinged to adjoining bottom portions. No provision is made for air to pass upwardly through the bottoms or for removal of the partitions. The roots of adjoining plants may grow together as is common to the prior art.

Other patents, which are illustrative of the state of the art, include U.S. Pat. Nos. 2,870,575; 2,944,696; 3,447,261; 3,53,594; 3,557,489; 3,667,159; 3,788,002; German Patent No. 547,677 and German Patent No. 2,362,457.

SUMMARY OF THE INVENTION

The invention contemplates the use of a number of partitions having diverging interconnected walls which may be placed into opposing relation each to the other for forming a plug compartment, open on each end so as to have a substantially fully open top and bottom by reason of the fact that the vertical troughs between the diverging walls are in registry with each other but which are tapered inwardly at the bottom to avoid loss of growing medium. Aligning and clamping means are provided so that the partitions are positioned together in opposed relation to form a block for accommodating plugs for growing seedlings. It has been found that it is possible to omit plugs of growing material from certain compartments in order to provide rows extending diagonally, perpendicularly or otherwise across the trays so as to provide air pruning at all contact points between compartments wherein the roots might grown from one adjoining plug to another. The plug system of the present invention is one which is commonly employed and wherein efforts have long been made to facilitate their use with easy removal from the growing container without the introduction of plant shock to the root systems of the seedlings. Not only has this been accomplished in such a way to facilitate future plant growth, but the maturity of the seedlings themselves in the tray is advanced by reason of introducing air upwardly through the trays while suitably supported in order to promote growth and development of the seedlings. It is possible that flow of heated air may be induced as illustrated, or carbon dioxide may be added to the air flow permitted between plugs in order to further enhance growth. Since the partitions are constructed of preferably integral molded plastic which should be relatively stiff, each of the diverging walls is illustrated as being bridged by a longitudinally aligned flat member which will oppose comparable flats on opposing partitions to prevent sliding of the partitions laterally and inwardly because either such motion would result in injury to the root systems. Since the trays may be slidable with respect to each other and the plugs readily dislodged, each may be readily removed for dislodging the plants grown therein. Thus, the problem persisting in the art of the roots growing together has been overcome by the provision of the apparatus illustrated herein.

As a result of the air pruning due to the open bottom and open adjacent compartment, the roots tend to grow downwardly, and when replanting occurs this tendency will continue because the roots will not have become disoriented through growing out at the bottom or sides through contact points into adjacent compartments. Air movement is permitted around the individual seedlings from the bottom up for facilitating growth, and heated or cooled air flow may be induced, and if desired, carbon dioxide may be included for producing stronger plants. By using warm air from the top, energy is saved. It is important to note also that the soil can be adjusted to meet the needs of a particular plant, and a relatively high or low plug can be utilized as needed. Moreover, the soil is where it needs to be since it may be evenly distributed from top to bottom. This is permitted because the partitions may be moved sequentially outwardly for removal of the plugs, and it is not necessary to grow the plugs into a downwardly tapering arrangement in order to facilitate removal. Where such downwardly tapering plugs were formerly employed, as in some of the prior art trays wherein the plugs are to be poked out from the bottom, there is a deficiency of soil which inhibits root growth at the bottom where growth should be more pronounced. By utilizing the partition assembly and clamping arrangement hereof, it is possible to remove partitions sequentially so as to avoid injury to such tapered root systems.

There is no adhesion of the plugs to the sides so that there is no damage to the plugs when the partitions are removed. It has been found possible to place the planting material within tbe compartments in such a way that no other containers are needed when partitions are positioned to form a block as described herein.

Since the plants are separated in a horizontal direction, mechanical transplanting is made possible. The strips can be packaged in small stacks which fit together to facilitate shipping.

BRIEF DESCRIPTION OF THE DRAWINGS

The construction designed to carry out the invention will be hereinafter described, together with other features thereof.

The invention will be more readily understood from a reading of the following specification and by refer

DESCRIPTION OF A PREFERRED EMBODIMENT

Figure 1:
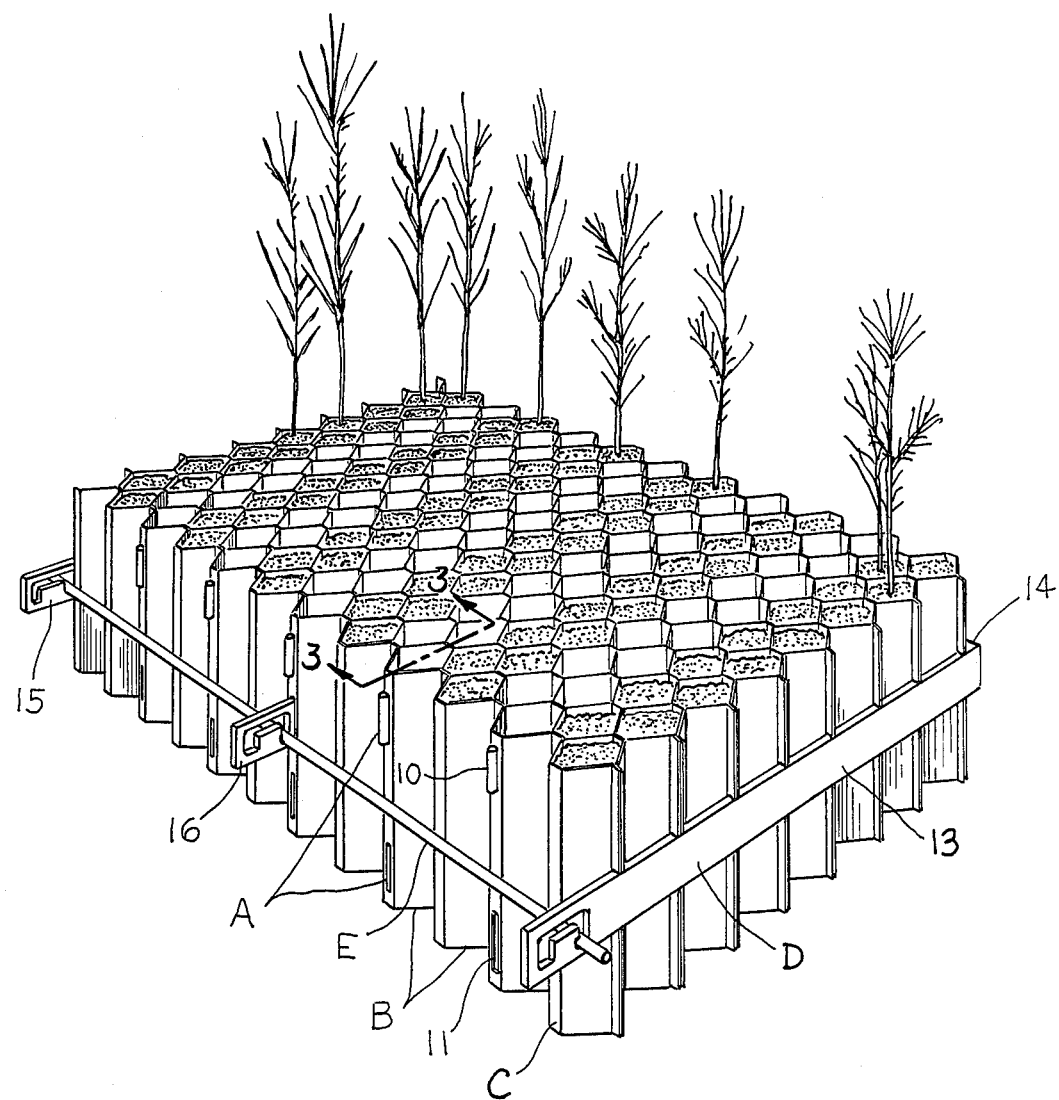
- FIG. 1 is a perspective view illustrating a block or tray having a partially open bottom formed of generally sinuous opposed partitions having diverging walls forming troughs therebetween which are in register with each other so that opposing troughs form compartments for holding respective plant growing material for seedlings in a plug arrangement.

A seedling growing container is illustrated including fastening means A for positioning partitions in a block as contemplated herein. A plurality of removable partitions are provided wherein each of the partitions includes a series of interconnected diverging walls B forming a trough between adjacent walls. The partitions are generally sinuous as illustrated in the drawings. The partitions are removably positionable with troughs of adjacent partitions in opposed relation forming respective growing compartments each suitable for growing a single seedling. Adjacent interconnected diverging walls of each of the partitions are bridged by a wall C extending longitudinally of the partition and which acts as a contact point with a similar wall on an adjacent partition. The fastening means A includes alignment tabs on an opposing adjacent surface of the bridging walls and tab receiving slots carried in each of the bridging walls. An open slot is carried at each of the opposite ends of the partitions receiving a circumferential fastening member. The fastening means further includes circumferential members D and a clamping bar E. As will be noted in the drawings, the bottom portions of the compartments containing plugs are tapered inwardly to prevent loss of growing material.

The block or tray may be supported by an open tray or otherwise as shown in copending application Ser. No. 520,758 filed Aug. 8, 1983, the disclosure of which is incorporated herein by reference. The drawings illustrate a partition in which the diverging walls are designated at B. The walls are joined by flats or bridging portions C which are aligned to be in register with an opposing flat as illustrated. These flats or bridging walls permit a tight and stable positioning of the partitions within the trays. The partitions thus, by being positioned firmly together, avoid sliding in either longitudinal direction while preventing the growth material from being forced together by inward movement of the partitions in such a way as to crush the growing material and root system contained therein. The walls B preferably diverge at an angle of approximately 90 degrees so as to avoid restricted corners which may tend to restrict the free removal of the plugs and plants after removal of the opposing partition. After removal of the adjacent partitions the plugs will simply fall out or away from the next partition.

The fastening means A includes elongated vertical projections 10 and complimentary slots 11 for receiving the projections 10 with sufficient tolerances to provide proper alignment of the partitions or strips with the required stability. The projection 10 and the slots 11 are carried by the walls C which bridge the diverging walls B and are spaced alternately on each strip or partition to assure reception with alignment of the strips as illustrated.

Figure 2:
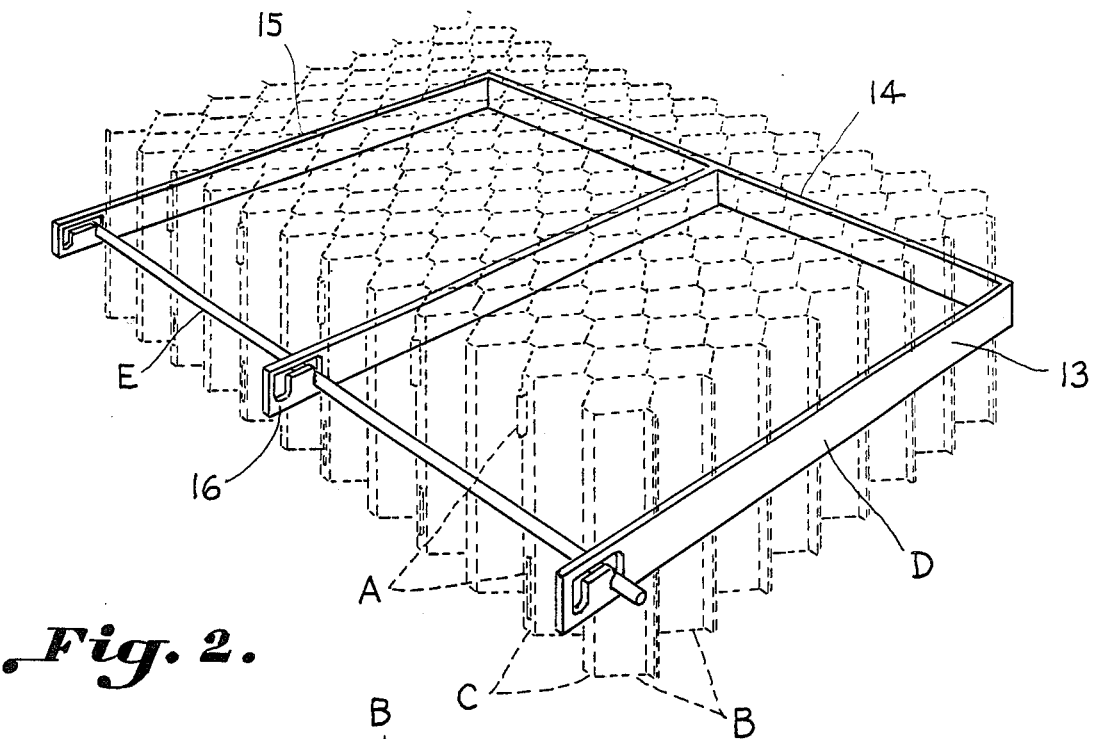
FIG. 2 is a perspective view illustrating aligning and clamping apparatus hereof.
Figure 3:
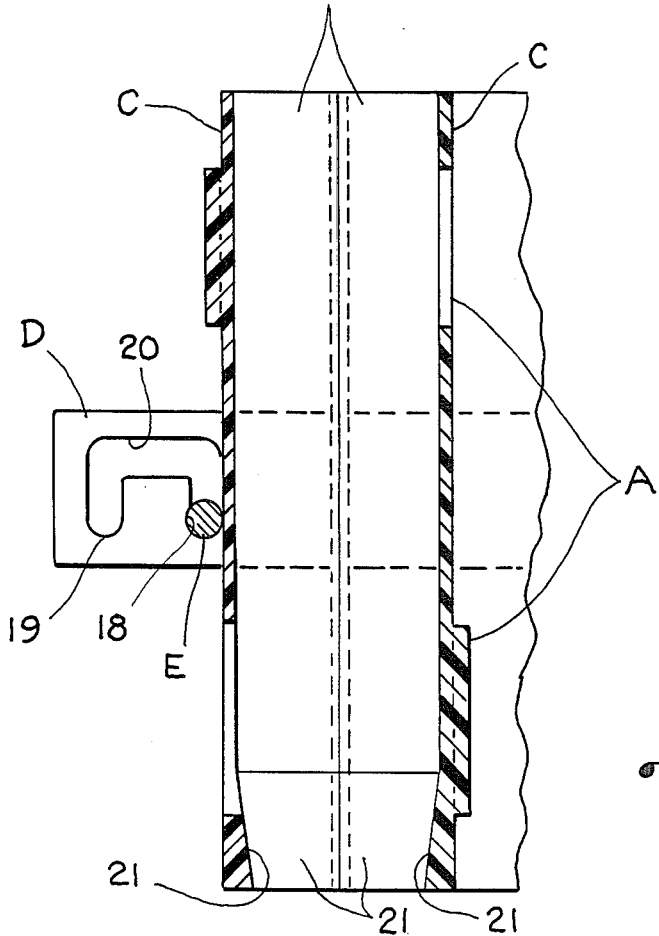
FIG. 3 is an enlarged sectional elevation taken on the line 3—3 in FIG. 1 illustrating a tapered bottom in the compartments.

The fastening means further includes an open slot 12 carried at each of the opposite ends of partitions. Circumferential fastening members D in the form of flat strips or bars extend about said block on three sides as at 13, 14 and 15 (FIG. 3). An intermediate fastening strip 16 is integral with the strips 13, 14 and 15 and passes through alignment slots 17. (FIGS. 2 and 15).

The drawings illustrate a partition or barrier which may be relatively tall to accommodate the extensive root systems of the tree seedlings involved. It is contemplated that such partitions may be approximately five inches tall, whereas for bedding plants, the partitions may not be more than approximately one-half inch tall with a similar height for the sides of the tray. As best illustrated in FIG. 4, the forwardmost partitions may be removed by sliding same outwardly successively permitting easy dislodgement of seedlings contained within the plugs of growing material in position between diverging walls of the next adjacent partition while supporting all of the partitions for easy assembly.

Figure 4:
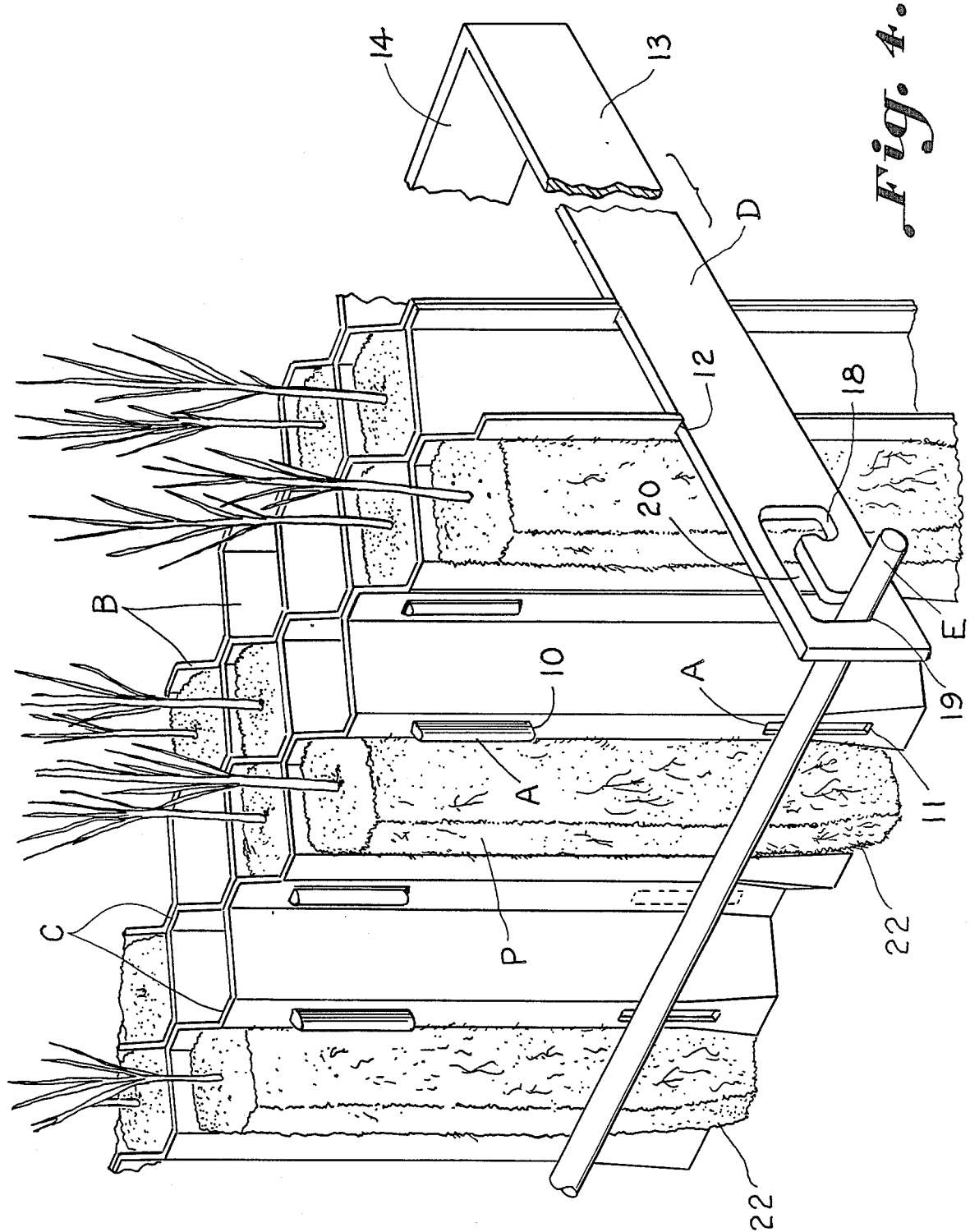
FIG. 4 is a perspective view further illustrating the honeycomb arrangement formed by the various partitions wherein every other cavity is maintained free of plant growing material so as to provide air pruning in area which are not entirely shielded by imperforate partition material and for aligning and clamping the assembly.
Figure 5:
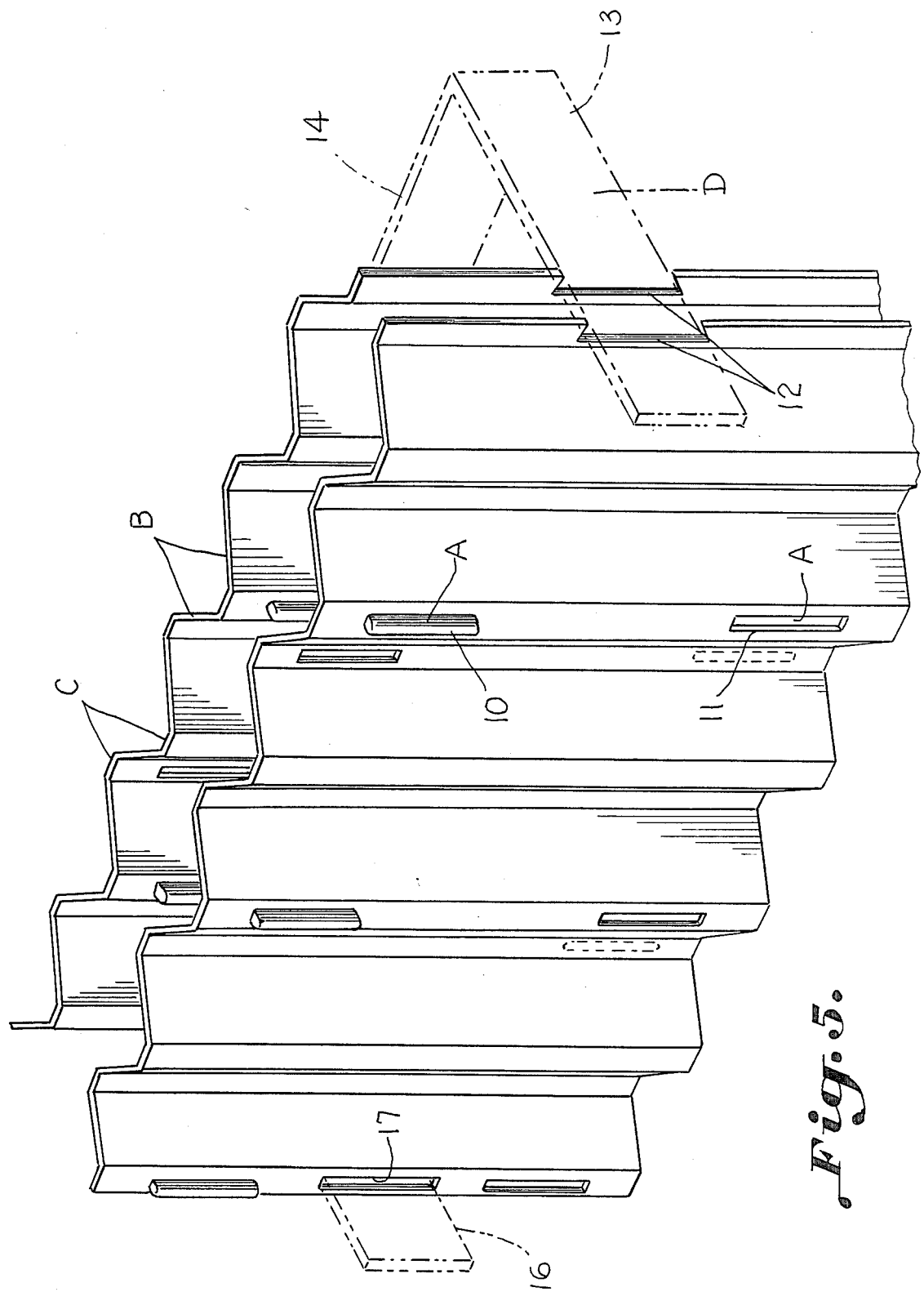
FIG. 5 is a perspective view illustrating a partition having means positioning such partitions in a block.

FIG. 4 also illustrates a planting arrangement wherein pairs of rows extending at right angles across the longitudinally positioned partitions are left open to provide air pruning at the contact points. Thus, two transverse rows of seedlings may be planted. Other possible alternate arrangement may be provided as where alternate diagonal rows of cells or compartments are left open to provide air pruning at contact points. It will be observed that no longitudinally adjoined compartments separated only by opposed flats (contact points) are permitted, as it is at these exposed points that the roots would otherwise grow between adjoining plugs. By leaving these compartments open, air pruning is permitted and also the flow of warm air is permitted through the bottom upwardly therethrough to promote growth of the seedlings.

Thus, the method of propagating seedlings contemplates positioning a number of opposed elongated removable generally sinuous barriers each having adjacent integrally interconnected diverging walls forming spaced troughs which are in opposed relation with troughs of adjacent barriers to contain respective plugs so as to form a barrier between respective plugs while positioning a series of spaced plugs of growing material aligned in one direction along said barers. Adjacent barriers contact one another at contact points on either side of each trough. Additional opposed removable barriers are positioned forming a number of series of plugs in another direction across said barriers. The plugs are arranged in each of the plurality of series with the plugs of an adjacent of said plurality of series as to form alternate rows of plugs wherein each plug is separated from adjacent plugs on each side either by barriers or by contact points which communicate with an air space.

Preferably, the partitions are integrally constructed of relatively stiff plastic material so as to promote sliding and for easy removal to facilitate exposure of the next layer of plugs to facilitate their removal. The compartments formed thereby are relatively stable, thereby promoting plugs of uniform size to provide adequate root formation to facilitate planting after suitable development of seedlings which may be advanced by exposure to warm air from the bottom of the container.

Means for positioning the bar E in a first position confining the partitions in a second position permitting removal of a single partition for removing adjoining seedling plugs P while supporting successively removed partitions include a C-shaped member having spaced downwardly extending bar receiving members 18 and 19 joined by an upper connecting member 20 for moving said bar from one position to the other (FIGS. 3 and 4). These clamping arrangements together with the projections 10 and slots 11 maintain alignment and stability of a block of any desired size or length.

FIG. 3 illustrates a tapering inner surface 21 in a lower portion of adjacent troughs forming tapering plugs 22 as shown in FIG. 4. The surfaces 21 are formed in the connecting walls C as well as the diverging walls B of the alternate compartments containing plugs. The resulting pressure on the soil causes the soil to compact and to hold in the compartment. A taper 21 at its bottom being 2 centimeters in length which tapers outwardly 1½ millimeters has been found to be satisfactory.

It is thus seen that by mechanically or manually separating the partitions from the plugs, it is possible to utilize total mechanical planting. This makes it possible to sow a crop utilizing the seedlings rather than seeds in areas where there would otherwise be too few frost-free days to permit such a crop were it necessary to use seeds. In other words, by utilizing seedlings, the time required for the germination of seeds is avoided so that a greater variety of crops is permitted in a given growing area, particularly in instances where there would be otherwise too few frost-free days. The method contemplates removing for a limited distance and then supporting as illustrated in FIG. 4, one strip at a time for dispensing the seedling plugs from successive rows.

While a preferred embodiment of the invention has been described using specific terms, such description is for illustrative purposes only, and it is to be understood that changes and variations may be made without departing from the spirit or scope of the following claims.

What is claimed is:

1. A plurality of generally sinuous partitions, each integrally formed of stiff bridging material, forming a plant growing container, each partition comprising:
   a series of interconnected diverging walls forming a series of troughs open on each end;
   each of said troughs being formed by an adjacent pair of interconnected diverging walls;
   each of said partitions being movably positionable with respective troughs of an opposed partition in registry with each of said troughs and with adjacent partitions having contact points on either side of opposed troughs forming respective growing compartments suitable for growing a single plant;
   adjacent interconnected diverging walls each being integrally formed and joined by a bridging wall extending therebetween longitudinally of respective partitions said bridging walls of one partition contacting bridging walls of adjacent partitions to form said contact points;
   fastening means carried by respective opposed bridging walls for removably joining said partitions to form a block;
   said fastening means including an open slot carried at each of the opposite ends of said partitions;
   circumferential fastening members connecting members extending about said block on three sides;
   a bar carried opposite the free ends of said circumferential fastening members; and
   means positioning said bar in a first position confining said partitions and in a second position permitting removal of a single partition for removing adjoining seedling plugs while supporting successively removed partitions.

2. The structure set forth in claim 1 including an intermediate slot spaced in alignment in a bridging wall of each partition, and an intermediate fastening member integral with said circumferential fastening members passing through each intermediate slot for adding stability and alignment to the partitions forming said block.

3. The structure set forth in claim 1 wherein said means positioning said bar are carried adjacent the free ends of said circumferential fastening members and include spaced downwardly extending bar receiving members joined by an upper connecting member for moving said bar from one position to the other.

4. The structure set forth in claim 3 including alignment tabs on an opposing adjacent surface of said bridging walls and tab receiving slots carried in each of said bridging walls.

* * * * *